United States Patent [19]
Minami et al.

[11] Patent Number: 6,126,519
[45] Date of Patent: Oct. 3, 2000

[54] METHOD OF GRINDING FERRULE FOR INCLINED PC CONNECTOR

[75] Inventors: Kouji Minami; Tomohiro Yoshikawa; Junji Taira, all of Chiba, Japan

[73] Assignee: Seiko Instruments Inc., Japan

[21] Appl. No.: 09/256,614

[22] Filed: Feb. 23, 1999

[30] Foreign Application Priority Data

Feb. 24, 1998 [JP] Japan .................................. 10-042544

[51] Int. Cl.$^7$ ...................................................... B24B 1/00
[52] U.S. Cl. .................. 451/41; 451/44; 451/59
[58] Field of Search ................................ 451/41, 271, 44, 451/57, 59, 278, 283, 285

[56] References Cited

U.S. PATENT DOCUMENTS

| | | | |
|---|---|---|---|
| 5,458,528 | 10/1995 | Lurie et al. | 451/41 |
| 5,601,474 | 2/1997 | Takahashi | 451/41 |
| 5,667,426 | 9/1997 | Minami et al. | 451/41 |
| 5,720,653 | 2/1998 | Miller et al. | 451/41 |
| 5,743,787 | 4/1998 | Ishiyama et al. | 451/41 |

FOREIGN PATENT DOCUMENTS

| | | |
|---|---|---|
| 4-039606 | 2/1992 | Japan . |
| 6201947 | 7/1994 | Japan . |
| 10031130 | 2/1998 | Japan . |

*Primary Examiner*—Eileen P. Morgan
*Attorney, Agent, or Firm*—Adams & Wilks

[57] ABSTRACT

In a method of grinding a ferrule, a ferrule is provided having a leading end portion having a surface disposed generally perpendicular to a longitudinal axis of the ferrule. A grinding device is provided having a rotational base, an elastic member disposed on the base for rotation therewith, and a grinding sheet disposed on the elastic member for rotation therewith. The surface of the leading end portion of the ferrule is brought into contact with a grinding surface of the grinding sheet. The base of the grinding device is then rotated until the surface of the leading end portion of the ferrule is ground into a spherical surface. The spherical surface of the leading end portion of the ferrule is then brought into contact with the grinding surface of the grinding sheet so that the longitudinal axis of the ferrule is inclined relative to the grinding surface. The base of the grinding device is then rotated until the spherical surface of the leading end portion of the ferrule is ground into a spherical surface so that the longitudinal axis of the ferrule is inclined relative to a tangent passing through a vertex of the spherical surface.

18 Claims, 6 Drawing Sheets prior art prior art

METHOD OF GRINDING FERRULE FOR INCLINED PC CONNECTOR

BACKGROUND OF THE INVENTION

The present invention relates to a method of efficiently grinding a ferrule used for an inclined PC connector by which inclined grinding surfaces of optical fibers are connected to each other.

As an optical connector used in an optical communication, or the like, an inclined PC (Physical Contact) connector is used for the purpose of reducing connection loss and beam reflection in the connecting section. In the inclined PC connector, an end face of an optical fiber is ground together with a ferrule to provide a convex spherical surface inclined with respect to a plane orthogonal to an axis of the optical fiber. As shown in FIG. 4, the ferrule 100 prior to the grinding process has a basically cylindrical configuration, which has a flange 110 at its rear end portion and a through-hole 111 for insertion and fixing of the optical fiber at its center. The leading end face of the ferrule is perpendicular to the through-hole 111.

This ferrule 100 is subjected to the grinding process as shown in FIGS. 5A–D. That is, an optical fiber 12 is held on the ferrule 100 having a truncated-cone like leading end portion defining the leading end face perpendicular to the axis, and then the leading end face is ground to provide a convex spherical surface, refer to FIG. 5A. After the eccentric direction of the core of the optical fiber 12 is inspected, the ferrule 100 is mounted to a jig in such a state that its leading end face is inclined, for instance, at 8° with respect to the surface 120a of the grinding abrasive wheel 120 (refer to FIG. 5B), and the leading end face is ground to provide an inclined planar face, (refer to FIG. 5C). Although the expression of "cut" may be more appropriate, the terminology "grind" is used for convenience. Here, the core eccentric direction is set, for instance, so as to be at the front side of this drawing. Subsequently, the process advances to a step of grinding the leading end face to provide a convex spherical surface in the similar mounting state to the jig. By this, the inclined PC grinding is completed. The inclined spherical grinding can be performed similarly to the general convex spherical grinding with the exception of the mounting state in which the ferrule 100 is mounted incliningly, and as shown in FIG. 5D, it is performed such that the ferrule end face is swung with a grinding table base 121 rotated under a condition that the ferrule end face is depressed onto a grinding sheet 123 placed through an elastic member 122 on the grinding table base 121.

In the prior art, in order to finish the end face of the ferrule 100 to provide an inclined surface, (hereafter, this step is referred to as "cutting" when applicable), the end face of the ferrule 100, which is chucked in an inclined state, is depressed onto the surface 120a of the rotating abrasive wheel 120. That is, the ferrule 100 is held and fixed onto a chuck in a state that the axis of the ferrule 100 is inclined at a predetermined angle, for instance, 8°, with respect to the normal of the abrasive wheel surface 120a, and the abrasive wheel 120 is depressed onto the ferrule 100 while being rotated, thereby effecting the inclined planar grinding onto the end face of the ferrule 100.

As noted above, the inclined spherical grinding of the prior art is performed such that the end face of the ferrule, which has the cylindrical base portion and tapered, truncated-cone-like leading end portion, is subjected to the general spherical grinding, the inspection of the core eccentricity, and then the inclined planar grinding, and thereafter the inclined planar end portion is ground to provide a spherical surface.

The above-noted inclined spherical grinding method, however, suffers from a problem in that it requires a larger number of grinding steps in comparison to the general ferrule grinding methods. Further, in a case of the inclined spherical grinding, it is preferable to reduce a curvature eccentricity of the leading end spherical surface in comparison to the general ferrule since there arises the adverse effect due to the rotative variation of the ferrule in the connector connecting portion.

SUMMARY OF THE INVENTION

In view of the above-noted circumstances, an object of the present invention is to provide a method of grinding a ferrule which can simplify the ferrule grinding steps of the inclined spherical grinding, and reduce the curvature eccentricity.

A first aspect of the present invention for solving the problem is a method of grinding a ferrule used in an inclined PC connector connecting inclined ground end faces of optical fibers to each other, and is characterized in that in a state where a perpendicular end face ferrule, having a cylindrical leading end portion smaller in diameter than a base portion or a truncated-cone-like leading end portion tapered from the base portion, which end portion defines a leading end face perpendicular to an axis, is brought into contact with a grinding sheet placed through an elastic member on a grinding table base with the axis inclined at a predetermined angle, the grinding table base is rotated about a rotation axis while the rotation axis is turned so that the perpendicular end face ferrule is ground to provide an inclined spherical end face.

According to a second aspect of the present invention, in the first aspect of the present invention, the method of grinding a ferrule is characterized in that an optical fiber is preliminarily held on the perpendicular end face ferrule.

According to a third aspect of the present invention, in the first aspect of the present invention, the method of grinding a ferrule is characterized in that an optical fiber is preliminary held on the perpendicular end face ferrule, and a leading end face thereof is ground to provide a spherical surface to effect a core eccentric adjustment.

According to a fourth aspect of the present invention, in the first aspect of the present invention, the method of grinding a ferrule is characterized by comprising a step of, after the inclined spherical grinding step, holding an optical fiber on the ferrule, and grinding a leading end to finish the same.

In the present invention, directly grinding a leading end face of a ferrule having a perpendicular end face into an inclined spherical surface provides an effect of suppressing a curvature eccentricity to be small.

DETAILED DESCRIPTION OF THE PREFERRED EMBODIMENTS

An embodiment of the present invention will be described with reference to the drawings.

Figure 1:
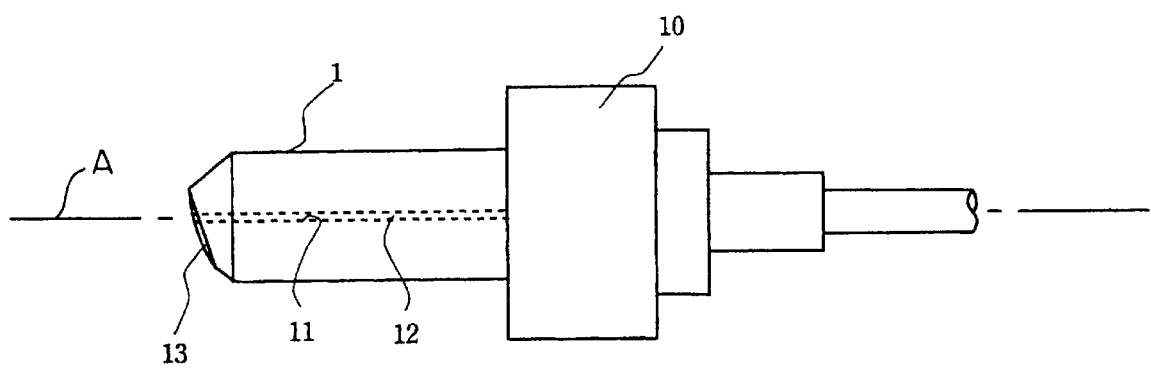
FIG. 1 is a plan view of a ferrule according to an embodiment of the present invention.

FIG. 1 is a plan view showing an example of a ferrule which has been ground through a grinding method according to the present invention. In FIG. 1, the ferrule 1, which has been ground through a grinding method according to the present invention, is basically similar in configuration to the prior art one. That is, it is substantially cylindrical, and has a flange 10 at its rear end portion, and a through-hole 11 at its central portion, extending along a longitudinal axis A thereof, to which an optical fiber 12 is inserted and fixed by adhesive. Further, the leading end portion of the ferrule 1 is formed with a convex spherical inclined surface 13 which is inclined, for instance, at 8° with respect to the surface orthogonal to the longitudinal axis. This inclined surface 13 is, for instance, about 5–12 mm in radius although it depends on the diameter of the ferrule 1.

In the inclined PC connector, this convex spherical inclined surface 13 is a connection surface by which the optical fiber 12 inserted and fixed onto the ferrule 1 is optically connected to the other mating optical fiber, and as noted above the convex spherical inclined surface 13 preferably has a smaller curvature eccentricity than the general ferrule. Accordingly, in the present embodiment, the curvatures eccentricity of the convex spherical inclined surface 13 is suppressed to be smaller by virtue of the later described grinding method.

Hereafter, the grinding steps for this ferrule will be described.

Figure 2A:
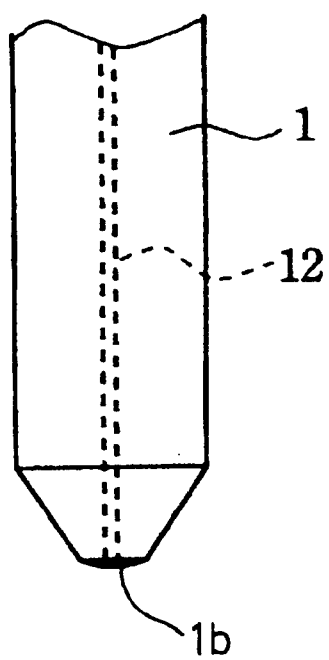
FIGS. 2A–2B show a grinding method according to the embodiments of the present invention.
Figure 2B:
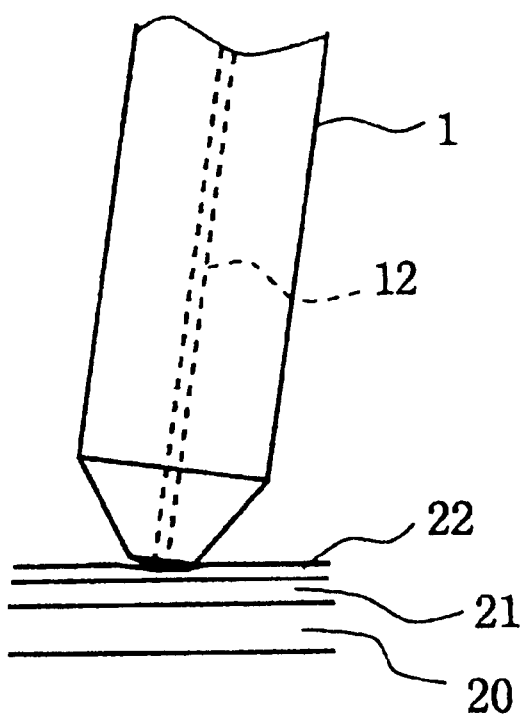
Figure 6:
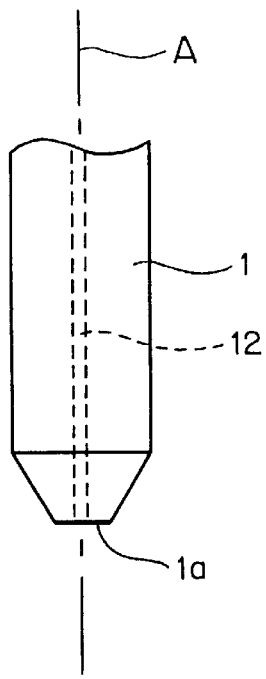
FIG. 6 is a plan view of a ferrule having a generally truncated-cone-shaped leading end portion.

FIGS. 2A–B and 6 show the grinding steps according to the present embodiment. The optical fiber 12 is adhesively held preliminarily on the ferrule 1 along the longitudinal axis A and has a truncated-cone-like leading end portion defining a leading end face 1a perpendicular to the longitudinal axis (FIG. 6). The leading end face 1a of the ferrule 1 in this state is first ground by a grinding machine or the like to provide a convex spherical surface 1b as shown in FIG. 2A, and then the eccentric direction of the core of the optical fiber 12 is inspected. This grinding step is similar to the prior art one.

Then, as shown in FIG. 2B, the ferrule 1 is mounted onto a jig such that the leading end face of the ferrule 1 can be contacted with a planar grinding sheet 22 placed on a grinding table base 20 through an elastic member 21 in an inclined manner, for instance, at 8°. Under this condition, the grinding table base 20 is rotated about its axis while the axis is turned so that the leading end face of the ferrule 1 is ground to provide a convex spherical inclined surface. Here, since the leading end face of the ferrule 1 has been ground to provide the convex spherical surface, that is, the portion contacted with the grinding sheet 22 is spherical, the grinding is carried out along that spherical surface. Therefore, the curvature eccentricity is suppressed.

Further, by applying a predetermined load to the ferrule 1 during the grinding, the elastic member 21 is elastically deformed and thus the grinding sheet 22 is permitted to be pressed downward to form the leading end face of the ferrule 1 into the convex spherical inclined surface. Therefore, by changing this load, a predetermined convex spherical configuration can be formed.

Thereafter, by grinding the leading end face in the similar mounting state to the jig, the inclined PC grinding is completed.

The ferrule 1 thus formed by the above-noted process is then assembled into an optical connector or the like, and connected to another optical connector to provide a reliable optical connection between the optical fibers.

Further, by grinding the end face of the ferrule through the grinding method according to the present invention, it is possible to reduce the curvature eccentricity, which is an important factor in the inclined PC connector. This can be proved by an experimental result described later.

Hereafter, the measurement result with respect to the curvature eccentricity on the ferrules, which have been ground through the grinding methods according to the present invention and prior art will be described, about 100 ferrules have been ground for each process.

Figure 3A:
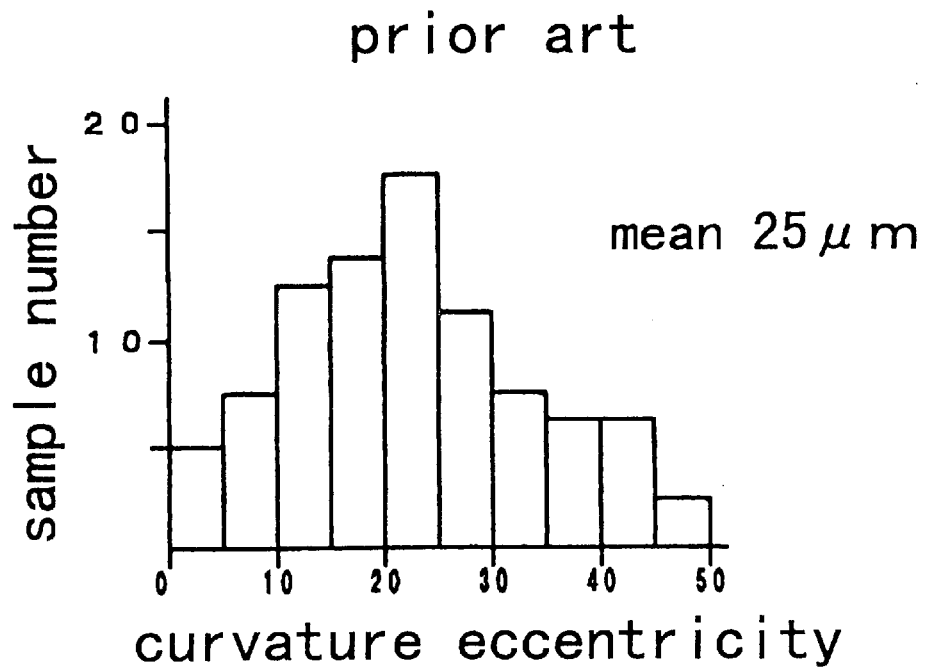
FIGS. 3A–3B are graphs showing curvatures eccentricity of ferrules which have been ground by the methods of the prior art and the present invention, respectively.
Figure 3B:
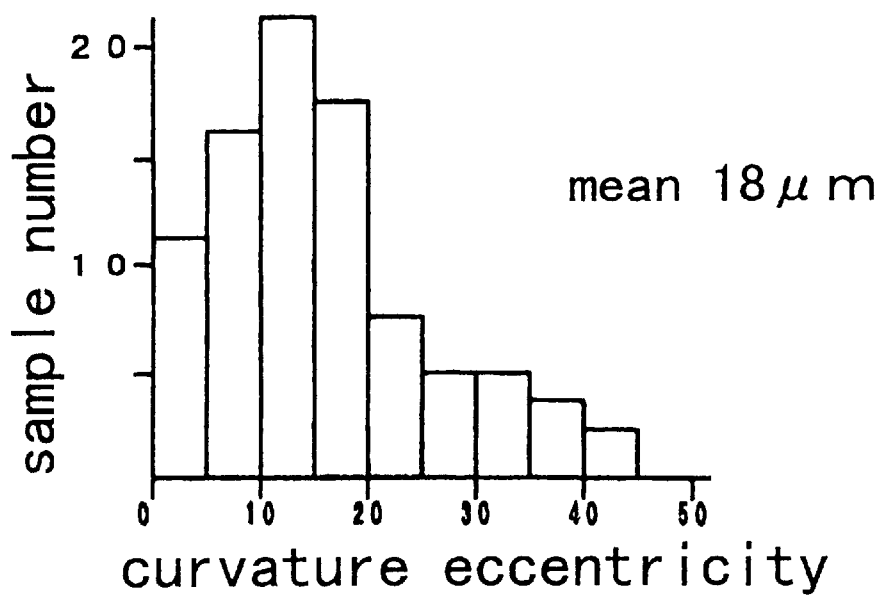
Figure 4:
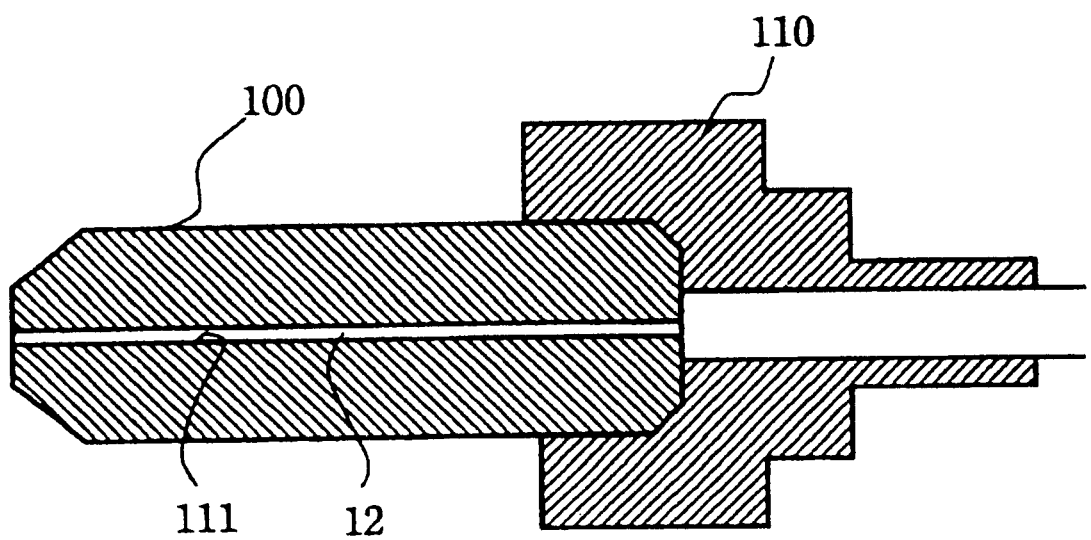
FIG. 4 is a cross-sectional view of a ferrule of the prior art.
Figure 5A:
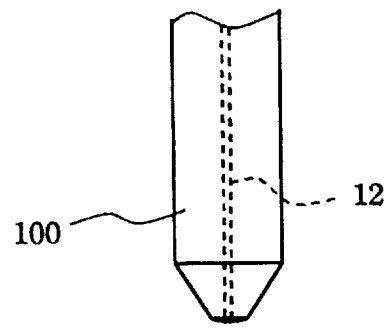
FIGS. 5A–5D show a grinding method of the prior art.
Figure 5B:
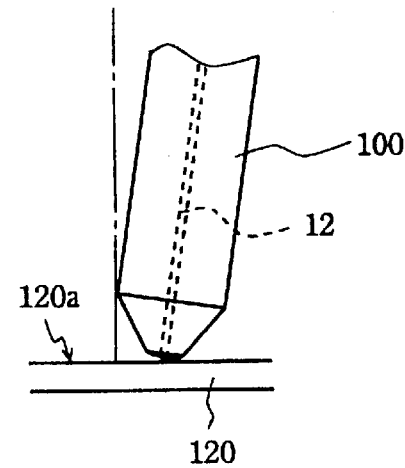
Figure 5C:
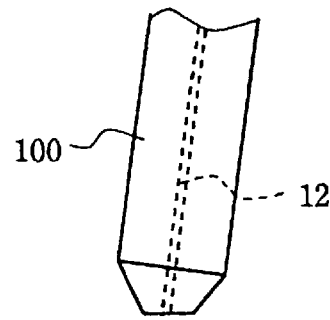
Figure 5D:
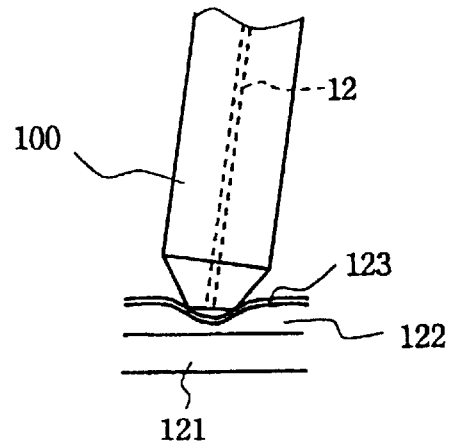

FIGS. 3 are histogram showing the result. FIG. 3A shows the result in the case where the prior art grinding method was employed. It can be found that the variation of the curvature eccentricity of the optical fiber is large and is much distributed to a relatively large-value range of 20–25 $\mu$m. In contrast, FIG. 3B shows the result in the case where the grinding method according to the present invention was employed, and it can be found from this histogram that the variation of the curvature eccentricity is small and the curvature eccentricity is much distributed to a relatively small-value range not more than 20 $\mu$m. In FIGS. 2, although the steps FIGS. 2A and 2B are applied to the ferrule having the truncated-cone-like leading end, these steps may be similarly applied to the ferrule having a cylindrical leading end.

This is evidenced by the following reason: That is, in the prior art method, since the ferrule having the perpendicular end face is first processed to have the planar inclined surface, as described above, and then this inclined surface is ground to provide the convex spherical surface, the grinding commences from the periphery of the planar inclined surface and finally the center of the grinding is formed. In contrast, according to the method of the present invention, since the convex spherical inclined surface is directly formed on the ferrule having the perpendicular end face, the grinding advances in one direction from the initially contacting end portion of the inclined surface. Therefore, it can be inferred that the deviation of the center of the grinding hardly occurs.

As described above, according to the grinding method of the present invention, the leading end face of the ferrule can be ground and processed with high precision, and as can be seen from the graph, the curvature eccentricity can be suppressed to be small. Further, according to the grinding method of the present invention, since the step of forming the planar inclined surface can be dispensed with, the number of steps can be reduced to improve the working efficiency.

Incidentally, the grinding sheet used in the present embodiment is not particularly limited, and for example, it is preferably formed by a diamond sheet having a particle size of 2–18 $\mu$m, a diamond grinding agent, or a combination of these, and the elastic member. Further, in the above description, 8° is given as an example of the inclined angle of the leading end face, but the present invention is not limited to this. For example, 9°, 12°, or the like can be selected appropriately depending on the kind of the optical fiber.

Figure 7:
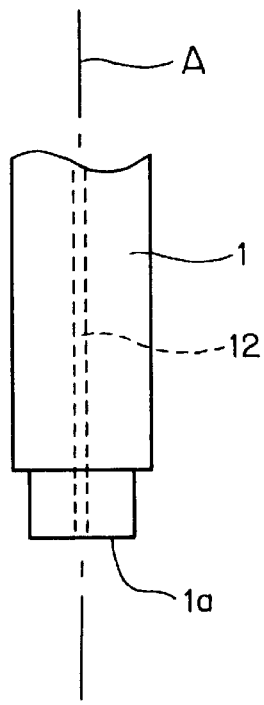
FIG. 7 is a plan view of a ferrule having a generally rectangular-shaped leading end portion.

Further, in the present embodiment, the leading end face of the ferrule having the leading end face perpendicular to the axis is ground to provide the convex spherical surface whose curvature center is on the optical axis, and then the axis is inclined and ground to provide the convex spherical inclined surface, the convex spherical surface which does not have the curvature center on the optical axis. The present invention is not limited to this. For example, the convex spherical inclined surface may be formed directly from the state in which the leading end face is planar, such as shown in FIGS. 6 and 7. In this case also, since the ferrule is inclined at a predetermined angle with respect to the grinding sheet, a leading portion that is initially contacted with the grinding sheet is substantially in the form of a point, and thus the curvature eccentricity can be suppressed. That is, the end portion of the ferrule in the direction perpendicular to the inclined direction presents a curve and the ferrule and the grinding sheet are contacted with each other through a central portion of this curve. Therefore, the curvature eccentricity can be suppressed similarly as described above.

Further, in the present embodiment, the grinding is carried out in a condition in which the optical fiber is preliminarily fixed to the ferrule. The present invention, however, is not limited to this. In a case where the core eccentricity adjustment is not required, a case where the processing accuracy of the ferrule is excellent, or the like, the inclined PC ferrule may be formed such that the ferrule is ground to provide the convex spherical inclined surface, and then the optical fiber is inserted and fixed to the ferrule, and thereafter the rear end face is ground.

Further, in the present embodiment, the perpendicular end face ferrule having the truncated-cone-like leading end potion tapered relative to the base portion is initially prepared (FIG. 7), but the grinding method of the present application may be applied to a ferrule which has a cylindrical leading end portion smaller in diameter than a base portion, i.e. a ferrule having a cylindrical base portion and a cylindrical leading end portion smaller in diameter than the base portion.

As described above, according to the present invention, since the convex spherical inclined surface is formed without the formation of the planar inclined surface, the curvature eccentricity can be reduced and the variation thereof can be reduced. Further, since the number of cutting step is reduced, the processing time can be shortened and the cost can be also reduced.

What is claimed is:

1. A method of grinding a ferrule comprising the steps of: providing a ferrule having a leading end portion having a surface disposed generally perpendicular to a longitudinal axis of the ferrule; providing a grinding device having a rotational base, an elastic member disposed on the base for rotation therewith, and a grinding sheet disposed on the elastic member for rotation therewith; grinding the surface of the leading end portion of the ferrule into contact with a grinding surface of the grinding sheet so that the longitudinal axis of the ferrule is inclined relative to the grinding surface; and rotating the base of the grinding device until the surface of the leading end portion of the ferrule is ground into a spherical surface so that the longitudinal axis of the ferrule is inclined relative to a tangent passing through a vertex of the spherical surface.

2. A method of grinding a ferrule according to claim 1; wherein the ferrule has a base diameter; and wherein the leading end portion of the ferrule is generally cylindrical-shaped and has a diameter smaller than the base diameter.

3. A method of grinding a ferrule according to claim 2; wherein the step of providing a ferrule comprises providing a ferrule having an optical fiber fixed thereto and extending to the surface of the leading end portion.

4. A method of grinding a ferrule according to claim 2; wherein the step of providing a ferrule comprises providing a ferrule having an optical fiber fixed thereto and having a leading end surface extending to the surface of the leading end portion of the ferrule so that the leading end surface of the optical fiber is ground into a spherical surface when the surface of the leading end portion of the ferrule is ground into the inclined spherical surface.

5. A method of grinding a ferrule according to claim 2; further comprising the step of holding an optical fiber to the ferrule so that a leading end surface of the optical fiber extends to the inclined spherical surface of the leading end portion of the ferrule; and grinding the leading end surface of the optical fiber into a spherical surface.

6. A method of grinding a ferrule according to claim 1; wherein the leading end portion of the ferrule has a generally truncated-cone shape tapering from a base portion of the ferrule.

7. A method of grinding a ferrule according to claim 6; wherein the step of providing a ferrule comprises providing a ferrule having an optical fiber fixed thereto and extending to the surface of the leading end portion.

8. A method of grinding a ferrule according to claim 6; wherein the step of providing a ferrule comprises providing a ferrule having an optical fiber fixed thereto and having a leading end surface extending to the surface of the leading end portion of the ferrule so that the leading end surface of the optical fiber is ground into a spherical surface when the surface of the leading end portion of the ferrule is ground into the inclined spherical surface.

9. A method of grinding a ferrule according to claim 6; further comprising the step of holding an optical fiber to the ferrule so that a leading end surface of the optical fiber extends to the inclined spherical surface of the leading end portion of the ferrule; and grinding the leading end surface of the optical fiber into a spherical surface.

10. A method of grinding a ferrule comprising the steps of: providing a ferrule having a leading end portion having a surface disposed generally perpendicular to a longitudinal axis of the ferrule; providing a grinding device having a rotational base, an elastic member disposed on the base for rotation therewith, and a grinding sheet disposed on the elastic member for rotation therewith; bringing the surface of the leading end portion of the ferrule into contact with a grinding surface of the grinding sheet; rotating the base of the grinding device until the surface of the leading end portion of the ferrule is ground into a spherical surface; bringing the spherical surface of the leading end portion of the ferrule into contact with the grinding surface of the grinding sheet so that the longitudinal axis of the ferrule is inclined relative to the grinding surface; and rotating the base of the grinding device until the spherical surface of the leading end portion of the ferrule is ground into a spherical surface so that the longitudinal axis of the ferrule is inclined relative to a tangent passing through a vertex of the spherical surface.

11. A method of grinding a ferrule according to claim 10; wherein the ferrule has a base diameter; and wherein the leading end portion of the ferrule is generally cylindrical-shaped and has a diameter smaller than the base diameter.

12. A method of grinding a ferrule according to claim 10; wherein the leading end portion of the ferrule has a generally truncated-cone shape tapering from a base potion of the ferrule.

13. A method of grinding a ferrule comprising the steps of: providing a ferrule having a longitudinal axis and a leading end portion having a surface disposed generally perpendicular to the longitudinal axis; bringing the surface of the leading end portion of the ferrule into contact with a grinding surface of a grinding member so that the longitudinal axis of the ferrule is inclined relative to the grinding surface; and effecting relative movement between the surface of the leading end portion of the ferrule and the grinding surface of the grinding member until the surface of the leading end portion is ground into a spherical surface so that the longitudinal axis of the ferrule is inclined relative to a tangent passing through a vertex of the spherical surface.

14. A method of grinding a ferrule according to claim 13; wherein the ferrule has a base diameter; and wherein the leading end portion of the ferrule is generally cylindrical-shaped and has a diameter smaller than the base diameter.

15. A method of grinding a ferrule according to claim 13; wherein the leading end portion of the ferrule has a generally truncated-cone shape tapering from a base portion of the ferrule.

16. A method of grinding a ferrule comprising the steps of: providing a ferrule having a longitudinal axis and a leading end portion having a surface disposed generally perpendicular to the longitudinal axis; bringing the surface of the leading end portion of the ferrule into contact with a grinding surface of a grinding member; effecting relative movement between the surface of the leading end portion of the ferrule and the grinding surface of the grinding member until the surface of the leading end portion is ground into a spherical surface; bringing the spherical surface of the leading end portion of the ferrule into contact with the grinding surface of the grinding member so that the longitudinal axis of the ferrule is inclined relative to the grinding surface; and effecting relative movement between the spherical surface of the leading end portion of the ferrule and the grinding surface of the grinding member until the spherical surface of the leading end portion is ground into a spherical surface so that the longitudinal axis of the ferrule is inclined relative to a tangent passing through a vertex of the spherical surface.

17. A method of grinding a ferrule according to claim 16; wherein the ferrule has a base diameter; and wherein the leading end portion of the ferrule is generally cylindrical-shaped and has a diameter smaller than the base diameter.

18. A method of grinding a ferrule according to claim 16; wherein the leading end portion of the ferrule has a generally truncated-cone shape tapering from a base portion of the ferrule.

* * * * *